(No Model.)
G. HOYER.
APPARATUS FOR JOINING PIPE.
No. 568,574. Patented Sept. 29, 1896.
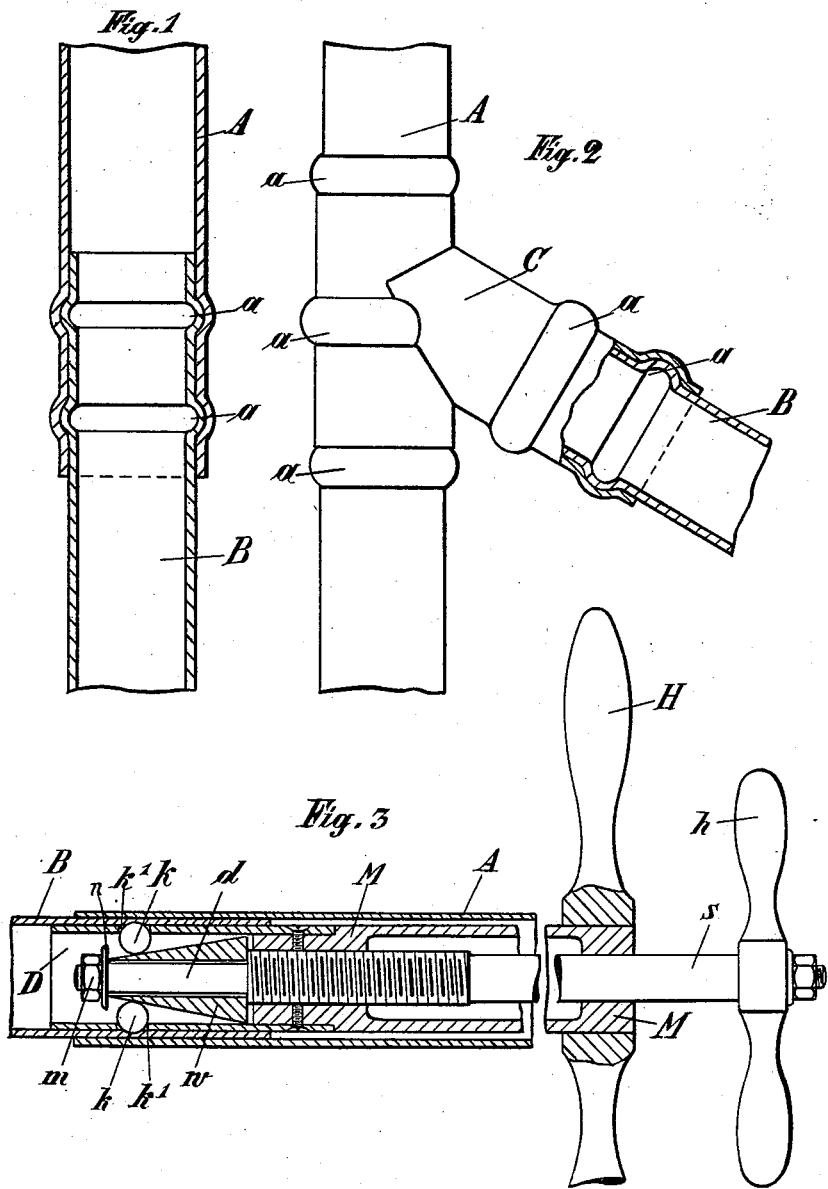

UNITED STATES PATENT OFFICE.

GUSTAV HOYER, OF SCHÖNEBECK, GERMANY.

APPARATUS FOR JOINING PIPES.

SPECIFICATION forming part of Letters Patent No. 568,574, dated September 29, 1896.

Application filed January 23, 1896. Serial No. 576,505. (No model.)

*To all whom it may concern:*

Be it known that I, GUSTAV HOYER, manufacturer, a subject of the King of Prussia, German Emperor, residing at Schönebeck, in the Kingdom of Prussia and German Empire, have invented Improvements in Methods of and Apparatus for Joining Pipes, of which the following is a specification.

My invention relates to a new and useful improvement in the method of and apparatus for connecting and fastening metal pipes without heating.

In the accompanying drawings, Figure 1 is a central longitudinal section of two pipes joined by my improved method; Fig. 2, a side elevation of an angle-coupling, one arm of which is shown in section; and Fig. 3 is a sectional elevation of my improved apparatus for carrying out the method.

In practice the ends of the pipes A and B are passed one over the other, after which a circular section thereof is acted upon by the improved apparatus, to be hereinafter explained, so as to expand or bulge the pipes, as clearly shown in the drawings, whereby they are securely held together without the necessity of soldering or heating.

The apparatus which I use in carrying out my improved method and which is shown in Fig. 3 consists of a circular casing M, having a reduced portion, through which the rod $s$ is threaded, and the inner end of this rod is reduced in diameter, so as to form a shank $d$, and upon this shank is journaled a cone-plug $w$, which is held in position by a suitable nut $m$ and washer $n$.

D is a cylinder which is secured to the casing M by means of suitable screws, and in this cylinder are formed openings $k'$ so arranged as to receive and guide the balls $k$. Upon the outer end of the rod $s$ is a handle $h$, whereby this rod may be revolved so as to cause it to thread in and out of the casing M, which will so operate the cone as to cause it to force the balls outward or permit them to be retracted for the purpose next explained.

The openings $k'$ are of such a size as to prevent the balls from falling out, and washer $n$ prevents them from leaving these openings when the cone $w$ is withdrawn. Therefore they are confined to a position which adapts them to be pressed outward, as described.

In manipulating this device the cylinder and casing are passed within the tubes A and B, after the latter have been brought into their proper relative position, and the handle $h$ manipulated so as to move the balls outward with pressure against the inner tube B, when the casing and cylinder are revolved by the handle H, which will cause the balls to track upon the inner tube and gradually expand it against the outer tube A, which will also be expanded by this action, thus forming the grooves or bulges $a$, whereby the two pipes will be firmly joined together. When this has been accomplished and it is desired to move the device from the pipes A and B, the handle $h$ is revolved in the opposite direction, causing the cone to move backward and permitting the balls to fall inward out of the grooves $a$, which they have formed, which will permit the ready removal of the device.

I claim—

1. An apparatus for fastening and joining tubes and the like, consisting of a hollow cylinder D, perforations $k'$, steel balls $k$, so arranged within said cylinder as to rotate therein and be guided thereby, a cone $w$ projecting within said cylinder and adapted to force the balls outward, a threaded rod $s$ having a shank $d$, upon which said cone is journaled, a handle for operating said rod and a handle for operating the cylinder, whereby the ball may be revolved and caused to track after having been forced outward substantially as and for the purposes set forth.

2. In a device of the character described, a hollow cylinder having perforations, balls arranged in the cylinder so as to rotate in the perforations, a cone within the cylinder adapted to force the balls outward, a rod threaded in the cylinder and having a shank on which the cone is journaled, a washer secured on the end of the rod to confine the balls to their proper positions, means for operating the rod and cylinder, as and for the purpose described.

3. In a device of the character described, a hollow cylinder, a metallic sleeve secured to the end of the cylinder, said sleeve having perforations, balls arranged in the sleeve so as to rotate in the perforations, a rod threaded in the cylinder and having a reduced end within the sleeve, a cone journaled on the reduced end of the rod and adapted to force the balls outward, a washer secured on the end of the rod adapted to retain the cone on the rod and confine the balls to their proper positions and handles on the rod and cylinder, as and for the purpose described.

In testimony whereof I hereunto set my hand in presence of two witnesses.

GUSTAV HOYER.

Witnesses:
W. HAUPT,
ROBERT KRAYN.